(12) United States Patent
Mizuno

(10) Patent No.: US 6,250,989 B1
(45) Date of Patent: Jun. 26, 2001

(54) APPARATUS FOR GRINDING EYEGLASS LENS

(75) Inventor: Toshiaki Mizuno, Aichi (JP)

(73) Assignee: Nidek Co., Ltd., Aichi (JP)

( * ) Notice: Subject to any disclaimer, the term of this patent is extended or adjusted under 35 U.S.C. 154(b) by 0 days.

(21) Appl. No.: 09/102,670

(22) Filed: Jun. 23, 1998

(30) Foreign Application Priority Data

Jun. 30, 1997 (JP) .................................................... 9-190687

(51) Int. Cl.$^7$ .................................................. B24B 49/00
(52) U.S. Cl. ................................. 451/5; 451/41; 451/43; 451/44
(58) Field of Search ................................. 451/5, 41, 42, 451/43, 44, 8, 9, 11, 12, 14, 65

(56) References Cited

U.S. PATENT DOCUMENTS

| | | | |
|---|---|---|---|
| Re. 35,898 | * 9/1998 | Shibata et al. | 451/5 |
| 4,135,333 | * 1/1979 | Stith | 51/160 |
| 4,945,684 | * 8/1990 | Wada et al. | 51/165.77 |
| 5,138,770 | 8/1992 | Matsuyama | 33/28 |
| 5,210,695 | * 5/1993 | Wood | 364/474.06 |
| 5,228,242 | 7/1993 | Matsuyama | 51/165.74 |
| 5,333,412 | 8/1994 | Matsuyama | 51/165.71 |
| 5,347,762 | 9/1994 | Shibata et al. | 451/15 |
| 5,775,973 | * 7/1998 | Watanabe | 451/5 |
| 5,890,949 | * 4/1999 | Shibata | 451/5 |

FOREIGN PATENT DOCUMENTS

| | | | |
|---|---|---|---|
| 0 576 268 | 12/1993 | (EP) . | |
| 0 710 526 | 5/1996 | (EP) . | |
| 0 826 460 | 3/1998 | (EP) . | |
| 0 839 609 | 5/1998 | (EP) . | |
| 3-20603 | 1/1991 | (JP) | G01B/5/06 |

* cited by examiner

*Primary Examiner*—Allen Ortega
*Assistant Examiner*—William Hong
(74) *Attorney, Agent, or Firm*—Sughrue, Mion, Zinn, Macpeak & Seas, PLLC (57) ABSTRACT

An eyeglass lens grinding apparatus which is designed to ensure that the lens processing operation proceeds smoothly enough to streamline the overall process flow. Processing information about right and left eyeglass lenses is provided on the basis of information about configuration of the eyeglass frame and information about a layout of each eyeglass lens with respect to the eyeglass frame. The processing information about the eyeglass lenses is stored in a memory even after processing has ended. Information about size correction is entered to modify the processing information. Lens corrective processing information is provided on the basis of the entered corrective information and the processing information stored in the memory. After sequentially processing the right and left eyeglass lenses on the basis of the processing information, corrective processing is carried out on the basis of the corrective processing information.

7 Claims, 6 Drawing Sheets

APPARATUS FOR GRINDING EYEGLASS LENS

BACKGROUND OF THE INVENTION

The present invention relates to an eyeglass lens grinding apparatus for grinding a pair of eyeglass lenses such that they conform to the shape of an eyeglass frame.

An eyeglass lens grinding apparatus is known that automatically performs all steps in the grinding process up to the bevelling stage on the basis of the processing information that is determined from the data of measurement for the shape of an eyeglass frame, layout data and the like to process the peripheral edge of an eyeglass lens.

This apparatus has the advantage that processing of the lens to conform to the shape of an eyeglass can be easily accomplished by merely entering the necessary data. Yet, glass and other lenses that do not have very high processability may sometimes fail to be processed with satisfactory precision on account of the mechanical rigidity of the apparatus. To deal with this problem, the processed lens is fitted into the eyeglass frame to see if it has the correct size and, if not, the second grinding, commonly called "double grinding", is performed to achieve a fine adjustment of the lens size (corrective processing).

In the double grinding, only the lens size is corrected on the basis of the information provided by preceding finishing step and the lens is subjected to another finishing step. This means that if an eyeglass lens for the right eye has been first processed, it must be fitted into the eyeglass frame to see if it has the correct size and, if not, it must be subjected to double grinding before processing of the lens for the left eye can be started. In other words, the lens for the left eye cannot be processed until after the checking of the size of the lens for the right eye (and its corrective processing if this is necessary) is complete and this has lowered the overall efficiency of the grinding operation.

SUMMARY OF THE INVENTION

The present invention has been accomplished under these circumstances and has as an object providing an eyeglass lens grinding apparatus with which the steps in the grinding process can be performed in a smooth way to realize a streamlined grinding operation.

To attain the above-noted and other objects, the present invention provides the following:

(1) An eyeglass lens grinding apparatus for grinding right and left eyeglass lenses such that they fit into an eyeglass frame, the apparatus comprising:

processing information providing means for providing processing information about the right and left eyeglass lenses based on information about a configuration of the eyeglass frame and information about a layout of each eyeglass lens with respect to the eyeglass frame;

memory means for storing the processing information about the eyeglass lenses even after their processing has ended;

corrective information input means for entering corrective information about size correction to modify the processing information;

computing means for providing lens corrective processing information based on the entered corrective information and the processing information stored in the memory means; and processing control means which, after sequentially processing the right and left eyeglass lenses based on the processing information provided by the processing information providing means, performs corrective processing based on the lens corrective processing information.

(2) An eyeglass lens grinding apparatus according to (1), wherein the corrective information input means has R/L specifying means for designating which one of the right and left eyeglass lenses is to be subjected to corrective processing.

(3) An eyeglass lens grinding apparatus according to (1), wherein the processing information providing means includes an edge thickness detection means for detecting an edge thickness of each eyeglass lens.

(4) An eyeglass lens grinding apparatus according to (1), wherein the computing means updates the processing information with the lens corrective processing information after the processing control means performs the corrective processing.

(5) An eyeglass lens grinding apparatus according to (4), wherein if further corrective information is entered through the corrective information input means after the processing control means performs the corrective processing, then the computing means provides further corrective processing information based on the entered further corrective information and the lens corrective processing information; and the processing control means performs further corrective processing based on the further corrective processing information.

(6) An eyeglass lens grinding apparatus according to (5), wherein the computing means updates the lens corrective processing information with the further lens corrective processing information after the processing control means performs the further corrective processing.

(7) A lens size fine adjustment system for use in an eyeglass lens grinding apparatus, the eyeglass lens grinding apparatus being designed to process a first eyeglass lens based on first lens processing information so as to fit into an eyeglass frame, and thereafter process a second eyeglass lens based on second lens processing information so as to fit into the eyeglass frame, the lens size fine adjustment system comprising:

a data memory which stores the first and the second lens processing information therein;

an input section through which a first correction amount for lens size fine adjustment to the first lens is entered in relation to the first lens if the first lens, which has been processed by the lens grinding apparatus, is still oversized;

a main arithmetic control circuit which calculates first lens corrective processing information based on the first lens processing information stored in the data memory and the first correction amount if the first correction amount is entered through the input section; and an abrasive wheel group which is controlled by the main arithmetic control circuit and which subjects the first lens to the lens size fine adjustment based on the first lens corrective processing information after the second lens has been processed by the lens grinding apparatus and if the main arithmetic control circuit calculates the first lens corrective processing information.

(8) A lens size fine adjustment system according to (7), wherein:

a second correction amount for lens size fine adjustment to the second lens is entered through the input section in relation to the second lens if the second lens, which has been processed by the lens grinding apparatus, is still oversized;

the main arithmetic control circuit calculates second lens corrective processing information based on the second lens processing information stored in the data memory and the second correction amount if the second correction amount is entered through the input section; and the abrasive wheel group is controlled by the main arithmetic control circuit and subjects the second lens to the lens size fine adjustment based on the second lens corrective processing information if the main arithmetic control circuit calculates the second lens corrective processing information.

(9) A lens size fine adjustment system according to (8), wherein the second lens is subjected to the lens size fine adjustment after the first lens has been subjected to the lens size fine adjustment.

The apparatus of the invention allows the size of an already processed lens for one eye to be checked for its correctness while the lens for the other eye is being processed and the processed lens can be subjected to double grinding if it is necessary. This reduces the waiting time of the apparatus, thereby shortening the overall processing time to realize an efficient operation.

The present disclosure relates to subject matter contained in Japanese patent application No. Hei. 9-190687 (filed on Jun. 30, 1997) which is expressly incorporated herein by reference in its entirety.

DETAILED DESCRIPTION OF THE PREFERRED EMBODIMENT

Figure 1:
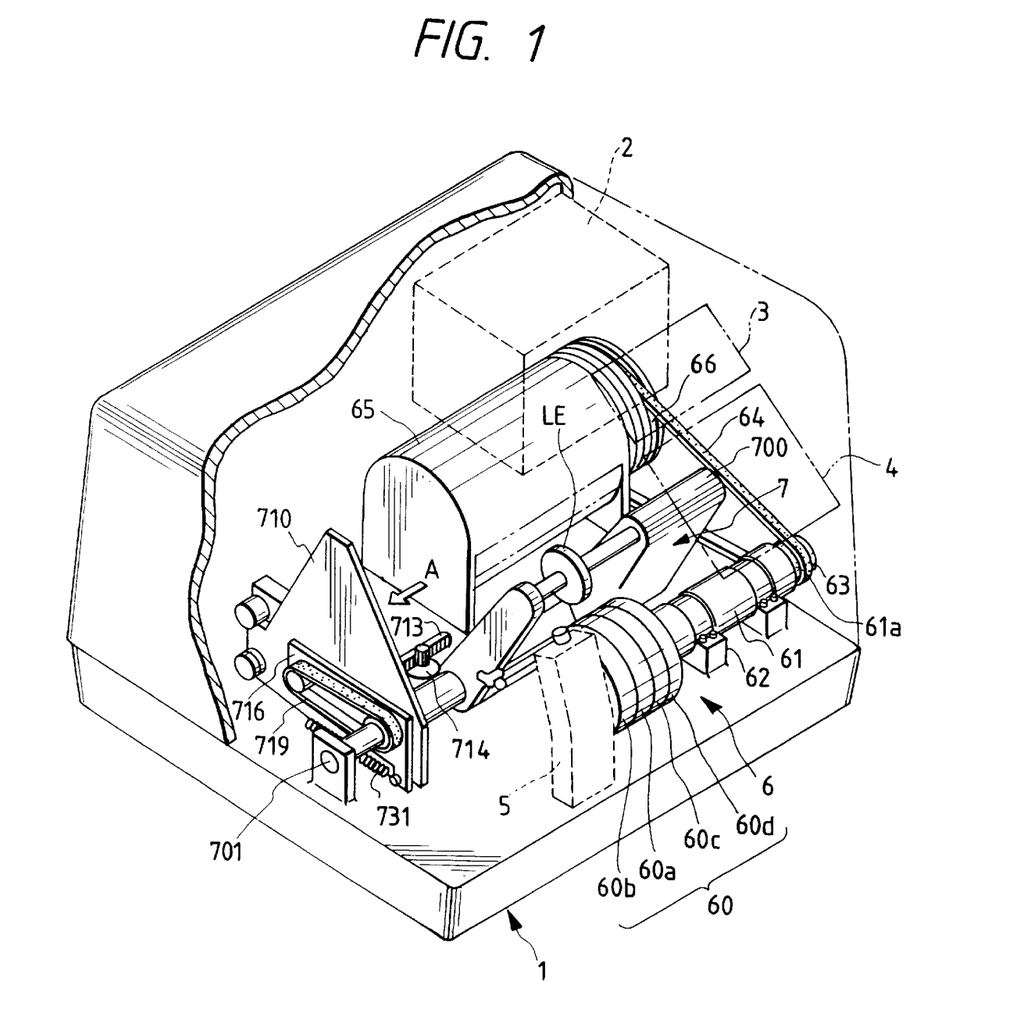
FIG. 1 is a perspective view showing the general layout of a lens grinding apparatus according to the preferred embodiment of the invention.

A preferred embodiment of the invention will now be described in detail with reference to the accompanying drawings. FIG. 1 is a perspective view showing the general layout of the eyeglass lens grinding apparatus of the invention. The reference numeral 1 designates a base, on which the components of the apparatus are arranged. The numeral 2 designates an eyeglass frame and template configuration measuring section, which is incorporated in the upper section of the grinding apparatus to obtain three-dimensional configuration data on the geometry of the eyeglass frame (or the template). Arranged in front of the measuring section 2 are a display section 3 which displays the results of measurements, arithmetic operations, etc. in the form of either characters or graphics, and an input section 4 for entering data or feeding commands to the apparatus. Provided in the front section of the apparatus is a lens configuration measuring section 5 for measuring the configuration (edge thickness) of an unprocessed lens.

The reference numeral 6 designates a lens grinding section, where an abrasive wheel group 60 made up of a rough abrasive wheel 60a for use on glass lenses, a rough abrasive wheel 60b for use on plastic lenses, a finishing abrasive wheel 60c for bevel (tapered edge) and plane processing operations and so on is mounted on a rotating shaft 61a of a spindle unit 61, which is attached to the base 1. The reference numeral 65 designates an AC motor, the rotational torque of which is transmitted through a pulley 66, a belt 64 and a pulley 63 mounted on the rotating shaft 61a to the abrasive wheel group 60 to rotate the same. Shown by 7 is a carriage section and 700 is a carriage.

(Layout of the Major Components)

Next, the layout of the major components of the apparatus will be described.

(A) Carriage section

Figure 2:
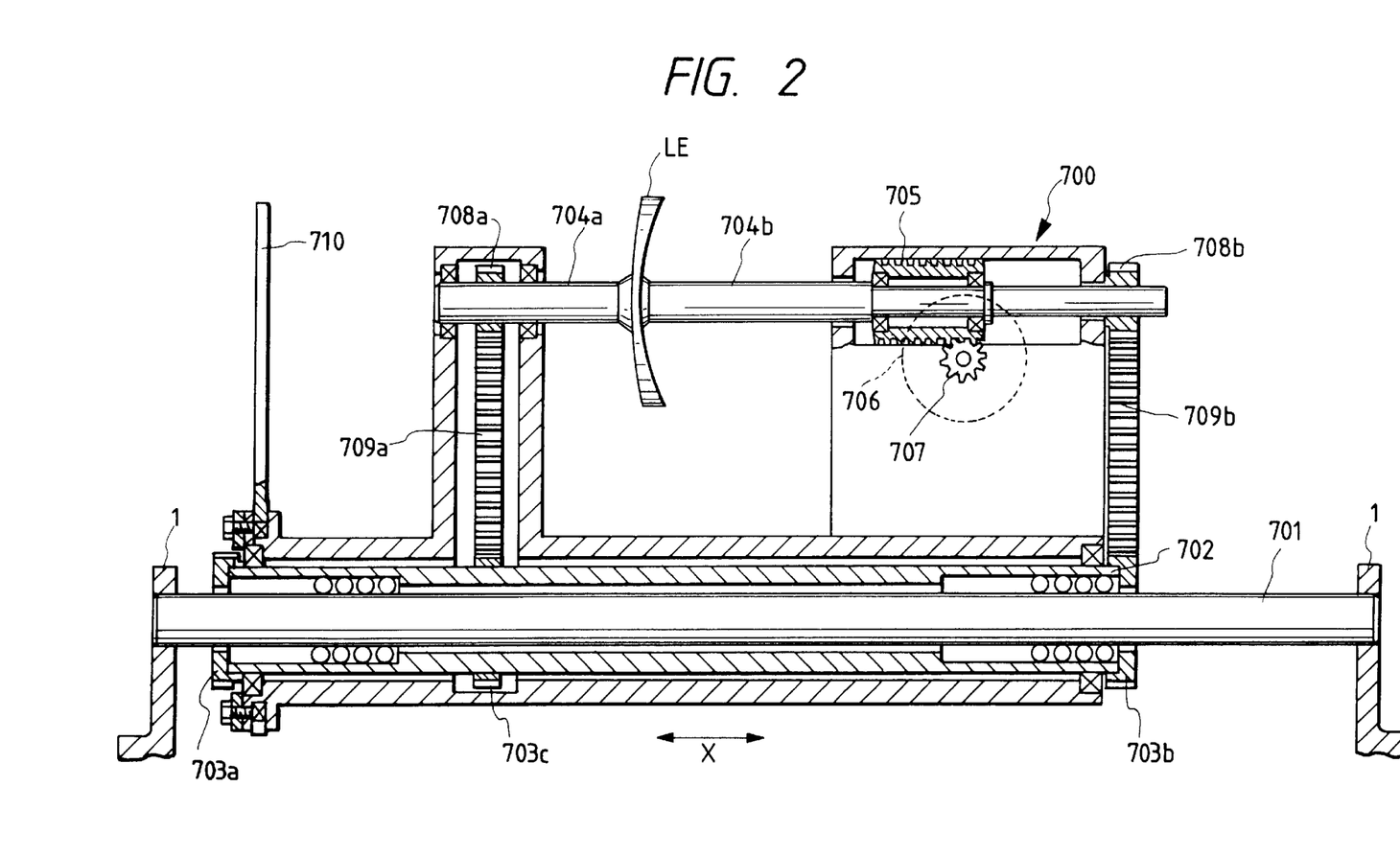
FIG. 2 is a sectional view illustrating the configuration of the carriage in the lens grinding apparatus.
Figure 3:
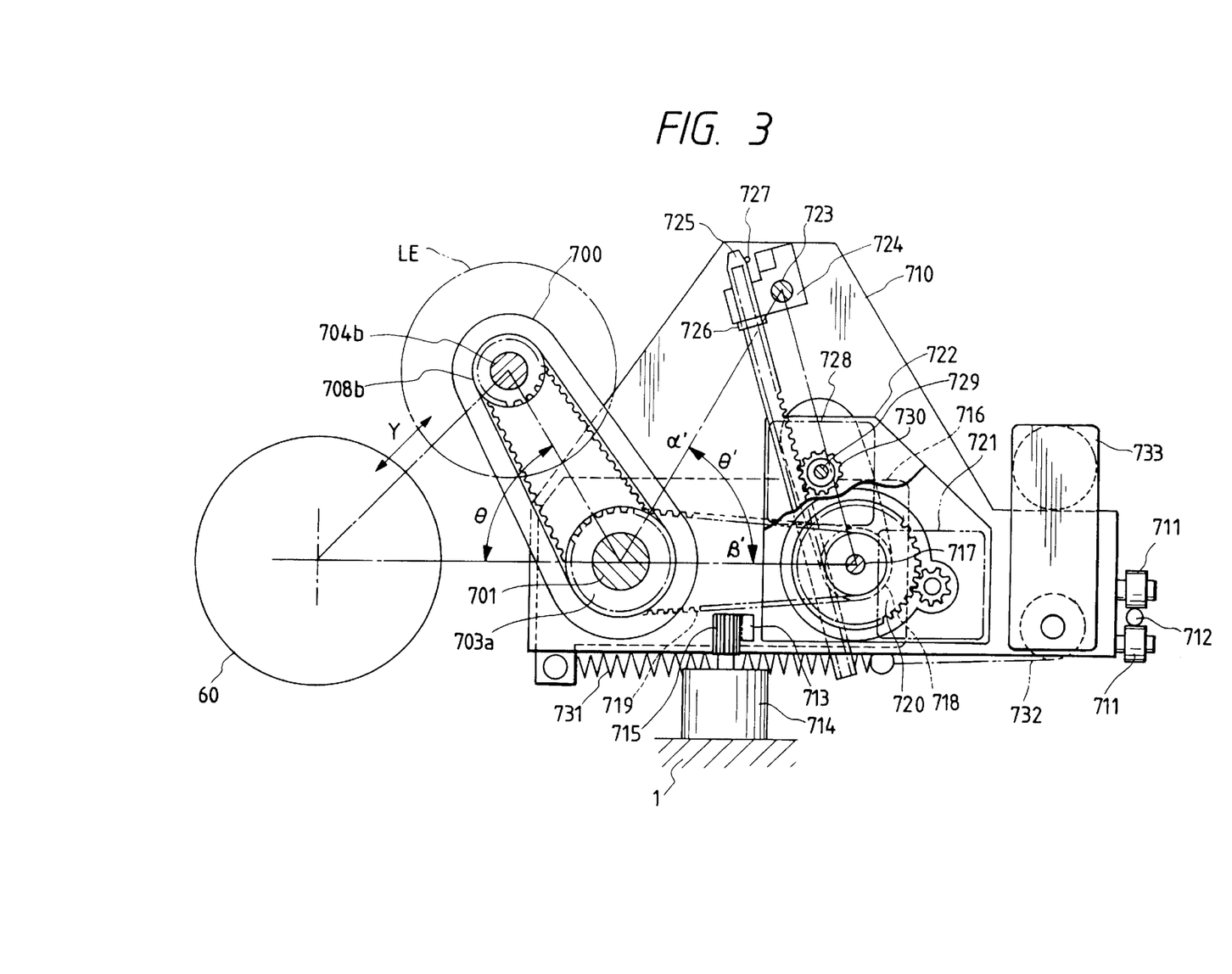
FIG. 3 is a diagram showing a drive mechanism for the carriage as seen in the direction of arrow A of FIG. 1.

The construction of the carriage section will now be described with reference to FIGS. 1 to 3. FIG. 2 is a cross-sectional view of the carriage, and FIG. 3 is a diagram showing a drive mechanism for the carriage, as viewed in the direction of arrow A in FIG. 1.

A shaft 701 is secured on the base 1 and a carriage shaft 702 is rotatably and slidably supported on the shaft 701; the carriage 700 is pivotally supported on the carriage shaft 702. Lens rotating shafts 704a and 704b are coaxially and rotatably supported on the carriage 700, extending parallel to the shaft 701. The lens rotating shaft 704b is rotatably supported in a rack 705, which is movable in the axial direction by means of a pinion 707 fixed on the rotational shaft of a motor 706; as a result, the lens rotating shaft 704b is moved axially such that it is opened or closed with respect to the other lens rotating shaft 704a, thereby holding the lens LE in position.

A drive plate 716 is securely fixed at the left end of the carriage 700 and a rotational shaft 717 is rotatably provided on the drive plate 716, extending parallel to the shaft 701. A pulse motor 721 is fixed to the drive plate 716 by means of a block 722. The rotational torque of the pulse motor 721 is transmitted through a gear 720 attached to the right end of the rotating shaft 717, a pulley 718 attached to the left end of the rotating shaft 717, a timing belt 719 and a pulley 703a to the shaft 702. The rotational torque thus transmitted to the shaft 702 is further transmitted through a timing belts 709a, 709b, pulleys 703b, 703c, 708a, and 708b to the lens rotating shafts 704a and 704b so that the lens rotating shafts 704a and 704b rotate in synchronism.

An intermediate plate 710 has a rack 713 which meshes with a pinion 715 attached to the rotational shaft of a carriage moving motor 714, and the rotation of the pinion 715 by the motor 714 causes the carriage 700 to move in an axial direction of the shaft 701.

The carriage 700 is pivotally moved by means of a pulse motor 728. The pulse motor 728 is secured to a block 722 in such a way that a round rack 725 meshes with a pinion 730 secured to the rotational shaft 729 of the pulse motor 728. The round rack 725 extends parallel to the shortest line segment connecting the axis of the rotational shaft 717 and that of the shaft 723 secured to the intermediate plate 710; in addition, the round rack 725 is held to be slidable with a certain degree of freedom between a correction block 724 which is rotatably fixed on the shaft 723 and the block 722. A stopper 726 is fixed on the round rack 725 so that it is capable of sliding only downward from the position of contact with the correction block 724. With this arrangement, the axis-to-axis distance r' between the rotational shaft 717 and the shaft 723 can be controlled in accordance with the rotation of the pulse motor 728 and it is also possible to control the axis-to-axis distance r between the abrasive wheel rotating shaft 61a and each of the lens rotating shafts 704a and 704b since r has a linear correlationship with r'.

A sensor 727 is installed on the intermediate plate 710 so as to detect the contact condition between the stopper 726 and the correction block 724. Therefore, the grinding condition of the lens LE can be checked. A hook of a spring 731 is hung on the drive plate 716, and a wire 732 is hung on a hook on the other side of the spring 731. A drum is attached on a rotational shaft of a motor 733 secured on the intermediate plate 710 so that the wire 732 can be wound on the drum. Thus, the grinding pressure of the abrasive wheel group 60 for the lens LE can be changed.

The arrangement of the carriage section of the present invention is basically the same as that described in the commonly assigned U.S. Pat. No. 5,347,762, to which the reference should be made.

(B) Display Section and Input Section

Figure 4:
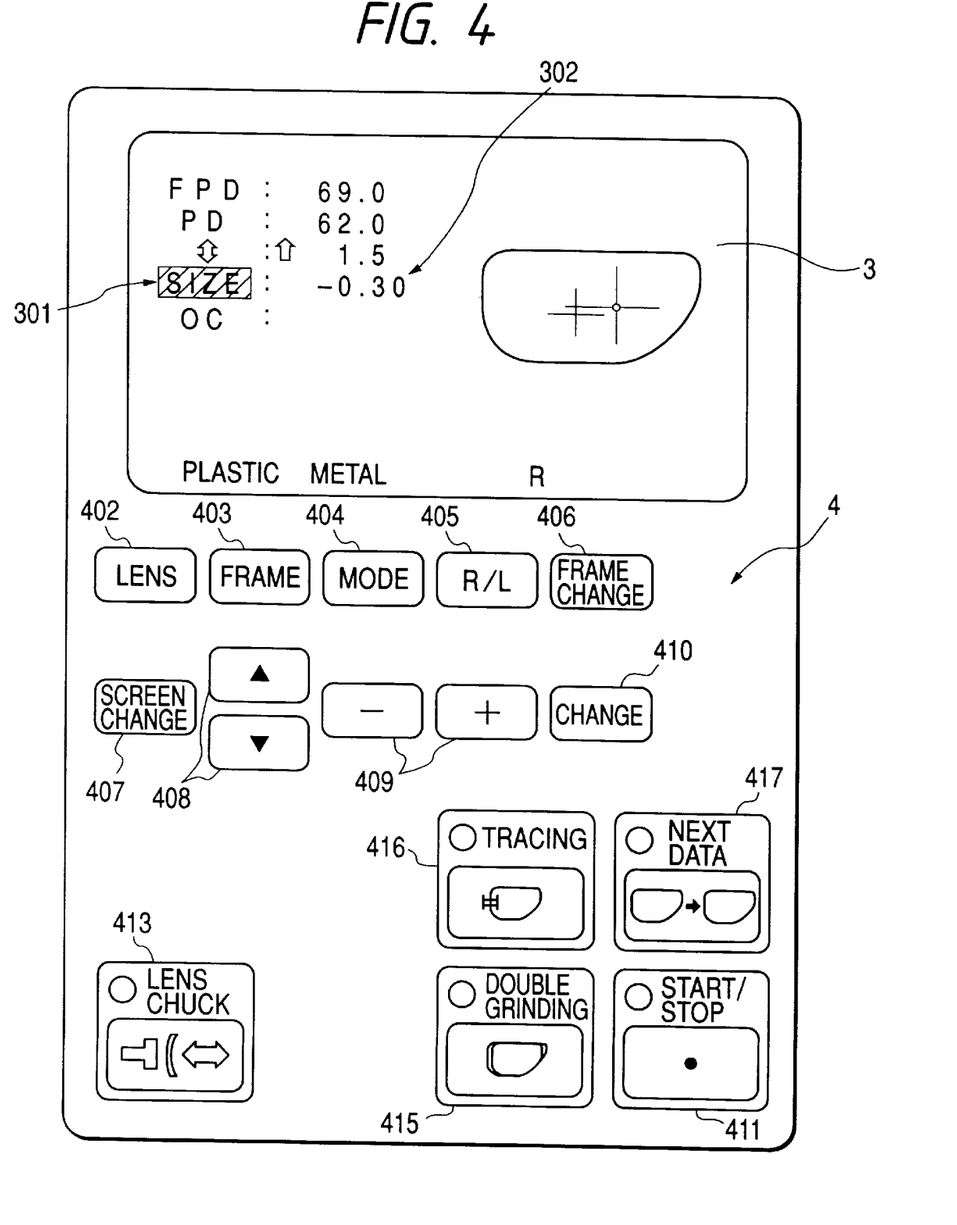
FIG. 4 is an external view illustrating the display section and the input section in the lens grinding apparatus.

FIG. 4 is a diagram showing the outer appearance of the display section 3 and the input section 4. The display section 3 is formed of a liquid-crystal display and, under the control of a main arithmetic control circuit to be described later, it displays, for example, a parameter setting screen, a layout screen with which layout information can be input, and a bevel simulation screen on which the position of a bevel with respect to the target lens configuration and the cross-sectional condition of the bevel are simulated.

The input section 4 includes various setting switches such as a lens switch 402 for instructing the constituent material of the lens to be processed, a frame switch 403 for distinguishing between plastics and metals as the constituent material of the frame, a mode switch 404 for selecting the mode of lens processing to be performed (for example, whether it is automatic bevel processing, forced bevel processing, or plane processing), a R/L switch 405 for determining whether the lens to be processed is for use on the right eye or the left eye, a screen change switch 407 for selecting a screen to be displayed on the display section 3 (for example, the layout screen, the menu screen or the parameter setting screen), move switches 408 for moving a cursor or arrow displayed on the display section 3 to thereby select items to be input, a "+" switch 409a and "−" switch 409b for numerical data input, a change switch 410 used to change the input manner of the layout data, a START/STOP switch 411 for starting or stopping the lens processing operation, a switch 413 for opening or closing the lens chucks, a switch 415 for instruction on the double grinding, a tracing switch 416 for instruction on the eyeglass frame and template tracing, and a next-data switch 417 for transferring the data obtained by the tracing.

(C) Electronic Control System for the Apparatus

Figure 5:
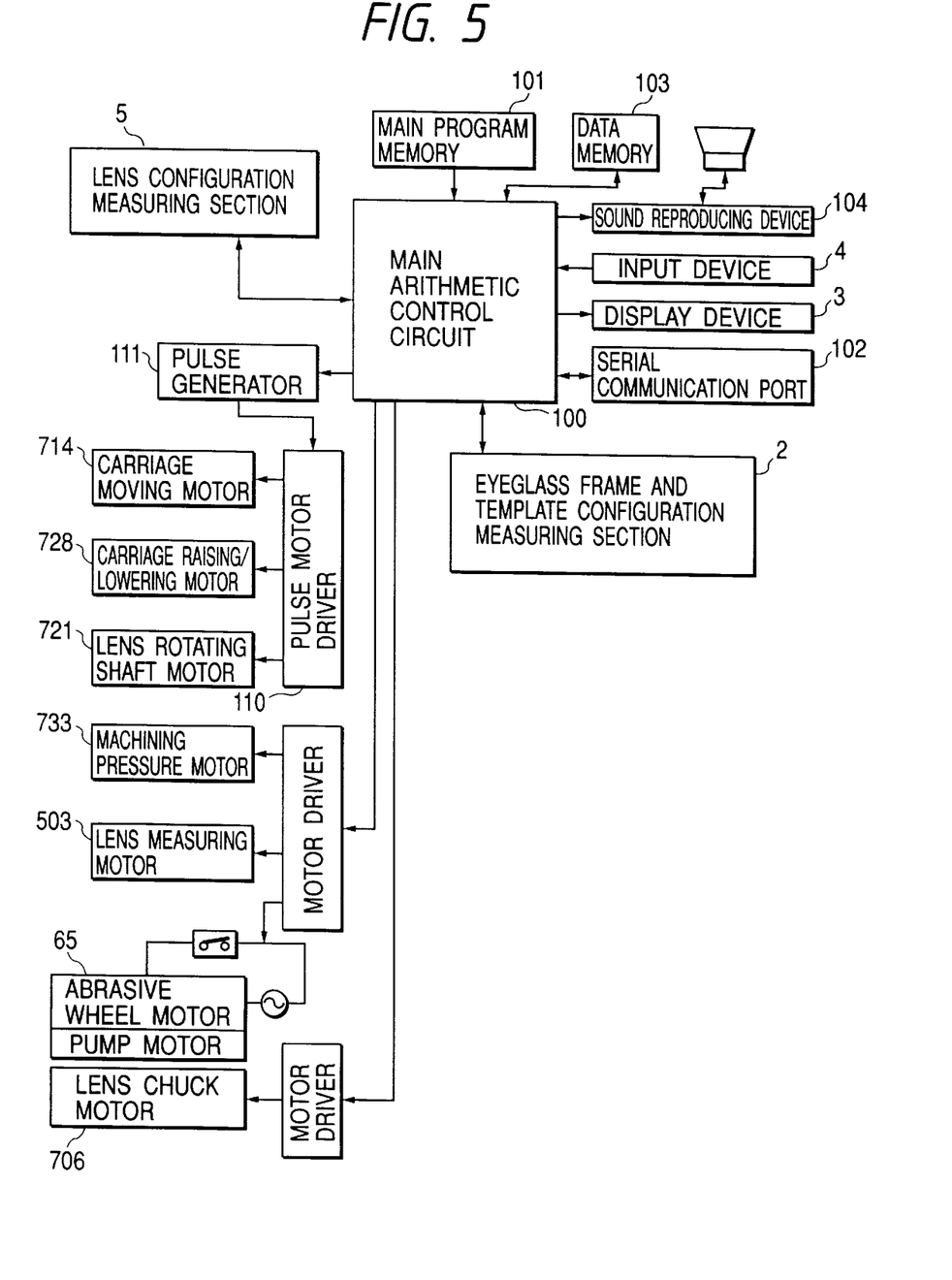
FIG. 5 shows the essential part of a block diagram for the electronic control system of the lens grinding apparatus.

FIG. 5 shows the essential part of a block diagram of the electronic control system for the eyeglass lens grinding apparatus of the invention. A main arithmetic control circuit 100 is typically formed of a microprocessor and controlled by a sequence program stored in a main program memory 101. The main arithmetic control circuit 100 can exchange data with IC cards, eye examination devices and so forth via a serial communication port 102. The main arithmetic control circuit 100 also performs data exchange and communication with an arithmetic control circuit of the eyeglass frame and template configuration measurement section 2. Data on the eyeglass frame configuration are stored in a data memory 103.

The display section 3, the input section 4, a sound reproducing device 104 and the lens configuration measuring section 5 are connected to the main arithmetic control circuit 100. The lens processing data which have been obtained by arithmetic operations in the main arithmetic control circuit 100 are stored in the data memory 103. The carriage moving motor 714, as well as the pulse motors 728 and 721 are connected to the main arithmetic control circuit 100 via a pulse motor driver 110 and a pulse generator 111. The pulse generator 111 receives commands from the main arithmetic control circuit 100 and determines how many pulses are to be supplied at what frequency in Hz to the respective pulse motors to control their operation.

Figure 6:
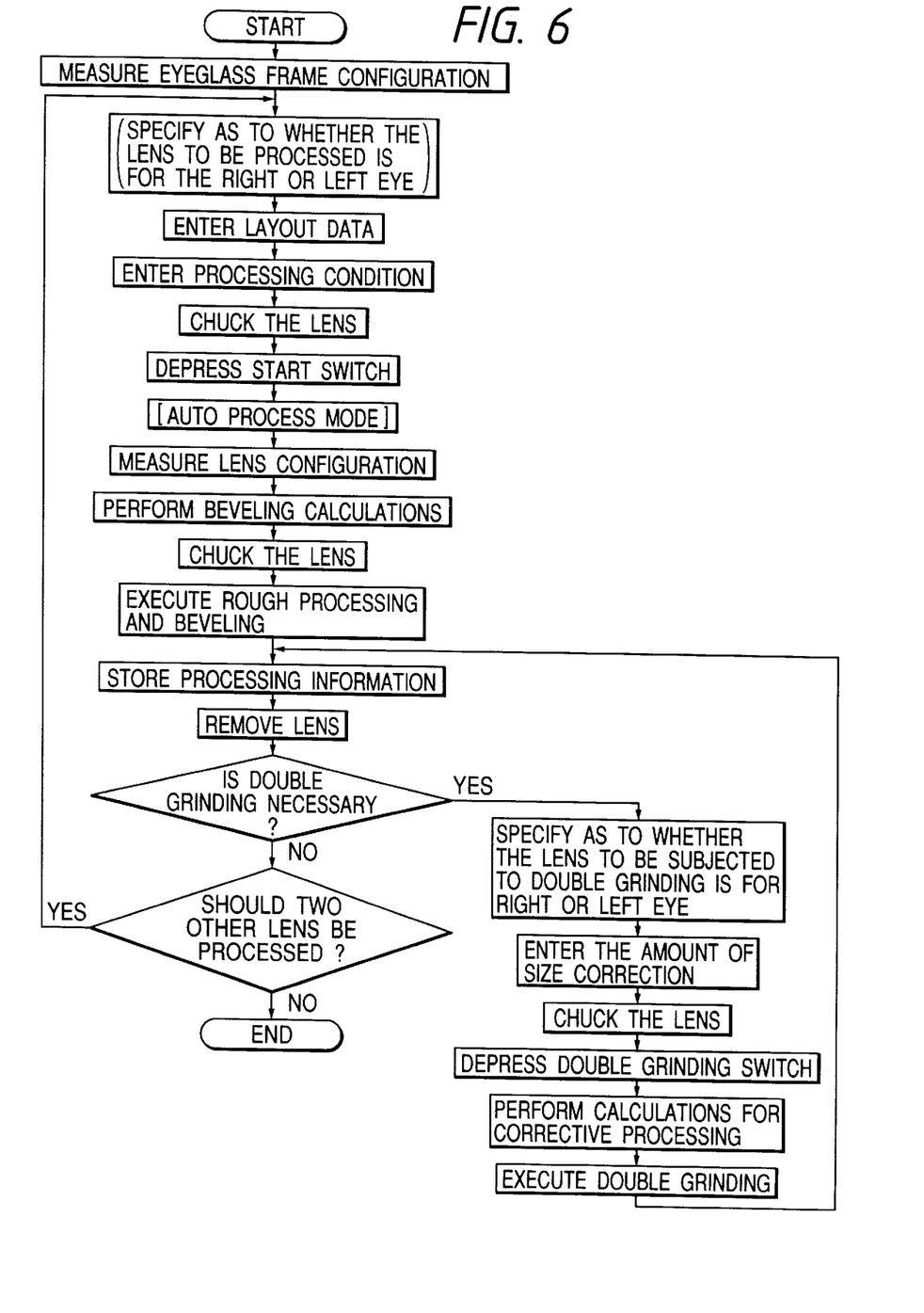
FIG. 6 is a flow chart for processing in AUTO PROCESS MODE that performs all steps in the lens grinding operation up to the bevelling stage.

The apparatus having the above-described structural design operates in the following manner, of which the description is directed to the case of selecting AUTO PROCESS MODE for automatically performing all steps in the grinding process up to the bevelling stage (see FIG. 6). (0026)

First, the operator sets an eyeglass frame on the eyeglass frame and template configuration measuring section 2 and depresses the TRACE switch 416 to start tracing. Upon depressing the NEXT DATA switch 417, the eyeglass frame data for the configurations of the lenses for both eyes as obtained by the configuration measuring section 2 (the data for the configuration of the lens for one eye and the data obtained by inverting it as with a mirror may combine to provide the data for the configurations of the lenses for both eyes) are stored in the data memory 103. At the same time, graphics representing the target configuration of a lens for the right eye is presented automatically on the screen of the display section 3 on the basis of the eye glass frame data, rendering the apparatus ready for the entry of processing conditions.

In the next step, the operator while looking at the screen of the display section 3 operates on the input section 4 to enter processing conditions such as layout data (e.g., PD of the user, FPD and the height of the optical center) and the constituent materials of the lens to be processed and the frame into which it is to be fitted. In addition, the operator selects AUTO PROCESS MODE by depressing the MODE switch 404. After entering the processing conditions, the lens for the right eye, which has been subjected to a specified preliminary operation (i.e., centering of the suction cup), is chucked between the lens rotating shafts 704a and 704b. Then, the START/STOP switch 411 is depressed to start processing of the lens for the right eye.

In response to the entry of a START signal, the apparatus performs calculation to effect processing correction and, thereafter, the lens configuration measuring section 5 is turned on to measure the lens configuration (with respect to the calculations to effect processing correction, the structural design of the lens configuration measuring section and the procedure of measurement with that section, see, for example, U.S. Pat. No. 5,347,762) and on the basis of the obtained information about the lens configuration (edge thickness), calculations for bevelling are performed to provide processing information.

When the processing information is provided, processing of the lens is executed with the motion of the carriage section 7 being controlled in accordance with a predetermined processing sequence. First, the apparatus moves the carriage 700 such that the chucked lens is positioned to confront the grinding wheel for rough processing that is determined by the designation of the constituent material of the lens, and the apparatus processes the lens with the drive of the associated motors being controlled on the basis of the processing information for rough processing. Subsequently, the apparatus disengages the lens from the rough processing abrasive wheel, positions it on the bevelling groove on the finishing abrasive wheel 60c and performs bevelling with the drive of the associated motors being controlled on the basis of the processing information for bevelling. When the processing of the lens for the right eye ends, the fact is stored indicating that the lens for the right eye has been processed and, at the same time, the processing information used in the processing of the lens for the right eye is stored in the area of the data memory 103 assigned to the right eye so that said processing information can be utilized in the step of double tracing.

When the processing of the lens for the right eye ends, the operator fits the lens in the eyeglass frame and checks if the lens size is correct. One advantage of the apparatus of the invention is that it allows the lens for the left eye to be processed while the operator is checking for the correctness of the lens for the right eye. If the lens for the left eye is to be processed, the R/L switch 405 is depressed to select the mode for processing of the lens for the left eye. Data for the configuration of the frame for the left eye is retrieved from the data memory 103 and the target configuration of the lens for the left eye is presented on the screen of the display section 3. As in the case of processing of the lens for the right eye, the operator enters processing conditions such as layout data about the lens for the left eye, which instead of the lens for the right eye, is chucked for subsequent processing. As in the case of the lens for the right eye, the apparatus measures the configuration of the lens for the left eye, performs calculations for bevelling and executes rough processing and bevelling in that order. When the processing of the lens for the left eye ends, the apparatus stores the fact that the lens for the left eye has been processed and, at the same time, the processing information used in the processing of the lens for the left eye is stored in the area of the data memory 103 assigned to the left eye.

While the apparatus is processing the lens for the left eye, the operator fits the already processed lens for the right eye into the eyeglass frame and checks if it has the correct size. If the lens for the right eye does not have the correct size, the operator provides the amount of correction that is required for double grinding.

If the lens for the right eye is to be subjected to double grinding, the operator who has ended the processing of the lens for the left eye depresses the R/L switch 405 to select the mode for processing the lens for the right eye. Graphics representing the layout of the lens for the right eye is again presented in the display section 3 on the basis of the information for the processing of the lens for the right eye stored in the data memory 103 and this makes it possible to enter the amount of lens size correction (see FIG. 4). The operator manipulates the switch 408 to mark the cursor 301 on "SIZE" on the display and he also manipulates the switch 409 to change the numerical representation 302, thereby entering the required amount of size correction (in the double grinding mode, change of items other than SIZE is prohibited). The lens for the right eye is rechucked. Since this step renders the apparatus to be prepared for double grinding, the operator depresses the switch 415 to start double grinding. The apparatus then retrieves the information for the processing of the lens for the right eye from the data memory 103, adds the entered amount of size correction and performs the necessary calculation to provide corrective information for double grinding. On the basis of the thus obtained corrective information about the lens for the right eye, the apparatus controls the drive of the associated motors to execute the processing for size correction. When the double grinding (corrective processing) of the lens for the right eye ends, the apparatus updates the processing information in the data memory 103 with the information for the processing that has been completed as the double grinding.

Another advantage of the apparatus of the invention is that the operator can check the size of the already processed lens for the left eye while the apparatus is performing double grinding of the lens for the right eye. If the lens for the left eye must also be corrected for size, the operator determines the required amount of correction. When the corrective processing of the lens for the right eye ends, the operator depresses the R/L switch 405 to select the mode of processing the lens for the left eye and after entering the required amount of size correction and rechucking the lens for the left eye in the same manner as in the double grinding of the lens for the right eye, the operator depresses the switch 415 to start double grinding. The apparatus adds the entered amount of size correction to the information about the preceding processing of the lens for the left eye, performs the necessary calculation for correction and performs the corrective processing of the lens for the left eye on the basis of the newly obtained corrective information. During the double grinding of the lens for the left eye, the lens for the right eye that has been subjected to double grinding is fitted again in the eyeglass frame to check if its size is correct. If it is still oversized, the lens for the right eye is processed for further correction after the end of the double grinding of the lens for the left eye.

Thus, the size of an already processed lens for one eye can be checked while the lens for the other eye is being processed and if it is found that the already processed lens needs double grinding (corrective processing), the required processing can be executed. This reduces the waiting time of the apparatus, thereby contributing to the reduction in the overall processing time. In addition, the processing operation will proceed smoothly enough to streamline the overall process flow.

It should be noted that the processing information stored in the data memory 103 is erased when the NEXT DATA switch 417 is depressed to have the data on the eyeglass frame entered by transfer for the next processing step.

What is claimed is:

1. An eyeglass lens grinding apparatus for grinding right and left eyeglass lenses such that they fit into an eyeglass frame, said apparatus comprising:

processing information providing means for providing processing information about the right and left eyeglass lenses based on information about a configuration of the eyeglass frame and information about a layout of each eyeglass lens with respect to the eyeglass frame;

memory means for storing the processing information about the right and left eyeglass lenses even after their processing has ended, and said processing information for one of said right and left eyeglass lenses retrievable after processing said other of said right and left eyeglass lenses;

corrective information input means for entering corrective information about size correction to modify the processing information, wherein the corrective information input means includes a selection switch for selecting and retrieving processing information to be corrected from the processing information stored in said memory means for said right and left lenses;

computing means for providing lens corrective processing information based on the entered corrective information and the processing information stored in said memory means;

grinding means for grinding eyeglass lenses;

processing control means which controls said grinding means in accordance with said processing information to grind eyeglass lenses, and which controls said grinding means in accordance with said lens corrective processing information to perform corrective processing; and a switch which deletes all of the processing information, stored in the memory means, for the right and left lenses, whereby the corrective processing can be performed on demand after the right and left eyeglass lenses have been processed consecutively based on the processing information provided by said processing information providing means.

2. An eyeglass lens grinding apparatus according to claim 1, further comprising a R/L specifying switch for designating which one of the right and left eyeglass lenses is to be subjected to corrective processing, wherein said selection switch is used as the R/L specifying switch.

3. An eyeglass lens grinding apparatus according to claim 1, wherein said processing information providing means includes an edge thickness detection means for detecting an edge thickness of each eyeglass lens, wherein the processing information is based on information about the edge thickness detected by the edge thickness detection means.

4. An eyeglass lens grinding apparatus according to claim 1, wherein said computing means updates the processing information with the lens corrective processing information after said processing control means performs the corrective processing.

5. An eyeglass lens grinding apparatus according to claim 4, wherein if further corrective information is entered through said corrective information input means after said processing control means performs the corrective processing, then said computing means provides further corrective processing information based on the entered further corrective information and the lens corrective processing information; and said processing control means performs further corrective processing based on said further corrective processing information.

6. An eyeglass lens grinding apparatus according to claim 5, wherein said computing means updates the lens corrective processing information with the further lens corrective processing information after the processing control means performs the further corrective processing.

7. An eyeglass lens grinding apparatus for grinding right and left eyeglass lenses such that they fit into an eyeglass frame, said apparatus comprising:

a processing information input section which inputs processing information about the right and left eyeglass lenses based on information about a configuration of the eyeglass frame and information about a layout of each eyeglass lens with respect to the eyeglass frame;

a memory which stores the processing information about the right and left eyeglass lenses even after their processing has ended, and said processing information for one of said right and left eyeglass lenses retrievable after processing said other of said right and left eyeglass lenses;

a corrective information input section which enters corrective information about size correction to modify the processing information, wherein the corrective information input section includes a selection switch which selects and retrieves processing information to be corrected from the processing information stored in said memory for said right and left lenses;

a computing section which provides lens corrective processing information based on the entered corrective information and the processing information stored in said memory;

a grinding wheel which grinds eyeglass lenses;

a processing control circuit which controls said grinding wheel in accordance with said processing information to grind eyeglass lenses, and which controls said grinding wheel in accordance with said lens corrective processing information to perform corrective processing; and a switch which deletes all of the processing information, stored in said memory, for the right and left lenses, whereby the corrective processing can be performed on demand after the right and left eyeglass lenses have been processed consecutively based on the processing information provided by said processing information input section.

\* \* \* \* \*